No. 673,233. Patented Apr. 30, 1901.
C. L. BERGER.
TELESCOPE LENS ADAPTER.
(Application filed Feb. 8, 1901.)
(No Model.)
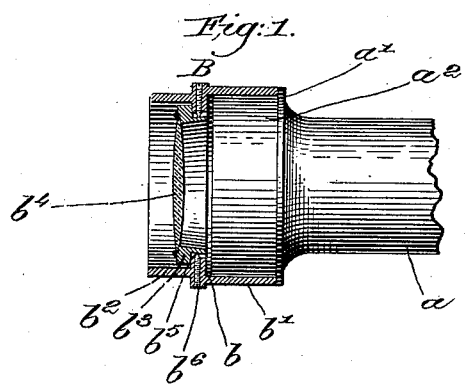
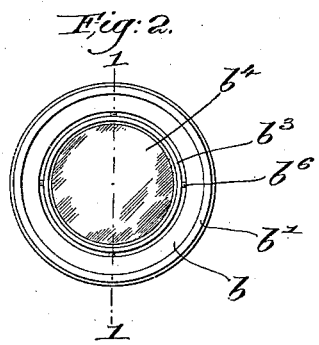
Witnesses
Edward F. Allen
Thomas J. Drummond
Inventor
Christian L. Berger
By Crosby & Gregory
attys
THE NORRIS PETERS CO., PHOTO-LITHO., WASHINGTON, D. C.

UNITED STATES PATENT OFFICE.

CHRISTIAN L. BERGER, OF BOSTON, MASSACHUSETTS.

TELESCOPE-LENS ADAPTER.

SPECIFICATION forming part of Letters Patent No. 673,233, dated April 30, 1901.

Original application filed July 7, 1899, Serial No. 723,006. Divided and this application filed February 8, 1901. Serial No. 46,560. (No model.)

*To all whom it may concern:*

Be it known that I, CHRISTIAN L. BERGER, a citizen of the United States, residing at Boston, in the county of Suffolk and State of Massachusetts, have invented an Improvement in Telescope-Lens Adapters, of which the following description, in connection with the accompanying drawings, is a specification, like letters on the drawings representing like parts.

My invention is an attachment for surveying instruments, being particularly intended for use with mining-transits, the present application being a division of my application, Serial No. 723,006, filed July 7, 1899.

In mine-surveying it is frequently the case that in extremely-narrow situations—as, for example, in a vertical shaft or shallow stoping, where a telescope is required to be accurate for short focusing—the ordinary telescope of the usual mining-transit is not adapted to the work, inasmuch as its focus is about five and one-half feet as a minimum, and it is therefore inefficient in such situations. Accordingly I have provided a short-focus-lens adapter having a special construction by which it can be slipped on and off of the usual telescope and is in turn itself adapted to receive another similar device for particularly narrow and confined situations, my mechanism including means for bringing the object-lens thereof into absolutely-correct alinement with the optical axis of the telescope as defined by the optical center of the object-glass and the cross-wires of the telescope, usually termed "line of collimation."

In the preferred embodiment of my invention as herein illustrated, Figure 1 represents in side elevation a fragment of a usual transit-telescope on which is mounted one of my short-focus-lens adapters, the latter being shown in central vertical section. Fig. 2 is a rear elevation of the lens-adapter removed from the telescope.

It will be understood that my invention is applicable to various kinds of instruments, and is therefore not limited to all the details as shown otherwise than as expressed in the claim at the end of this specification.

In the drawings, $a$ indicates a telescope or telescope-tube provided at its forward end with a usual radial flange $a'$ and longitudinal flange $a^2$.

The lens-adapter B comprises a ring-holder $b$, having a rearwardly-extending flange $b'$, having a sliding fit on the flange $a^2$ of the telescope, and a forwardly-projecting flange $b^2$, smaller than the rear flange and adapted to receive the rear flange of a similar lens-holder. The ring-holder $b$ holds a ring or diaphragm $b^3$, carrying a proper lens $b^4$, said ring having at its rear side an inclined wall $b^5$, outwardly flaring or conical, extending past the ring-holder $b$ and against which bear centering-screws $b^6$, which operate through the ring-holder $b$. The adjusting or centering screws $b^6$ by pressing upon the inclined sides of the flange $b^5$ maintain the ring $b^3$ pressed tightly against the ring-holder $b$.

As herein shown, there are four of the adjusting or centering screws $b^6$, (see Fig. 2,) arranged in diametrically opposite pairs, thus providing means whereby the optical axis of the object glass or lens $b^4$ may be brought readily and accurately into alinement with the optical axis of the object-glass of the main telescope.

By the use of one or more short-focus-lens adapters the focus of the instrument may be shortened as much as desired, it being only necessary to use one adapter for a given distance less than five and one-half feet or thereabout and an additional adapter for distances not within the range of the one alone, as will be evident without further explanation.

I do not herein claim the broad idea of providing an additional or short-focus lens in connection with an optical instrument.

Having described my invention, what I claim, and desire to secure by Letters Patent, is—

The combination with a surveyor's telescope, of a short-focus-lens adapter consisting of a ring-holder provided with a flange fitting on the forward end of the telescope, and a ring or diaphragm held by said ring-holder and carrying a lens, said diaphragm having at its rear side a wall extending past said ring-holder and flaring outwardly in a conical shape, and said ring-holder being provided with opposite adjusting-screws bearing on the inclined conical surface of said wall.

In testimony whereof I have signed my name to this specification in the presence of two subscribing witnesses.

CHRISTIAN L. BERGER.

Witnesses:
GEO. H. MAXWELL,
JOHN C. EDWARDS.